J. G. MACLAREN.
PNEUMATIC DESPATCH TUBE APPARATUS.
APPLICATION FILED MAY 14, 1908. RENEWED MAY 17, 1912.
1,032,150.
Patented July 9, 1912.
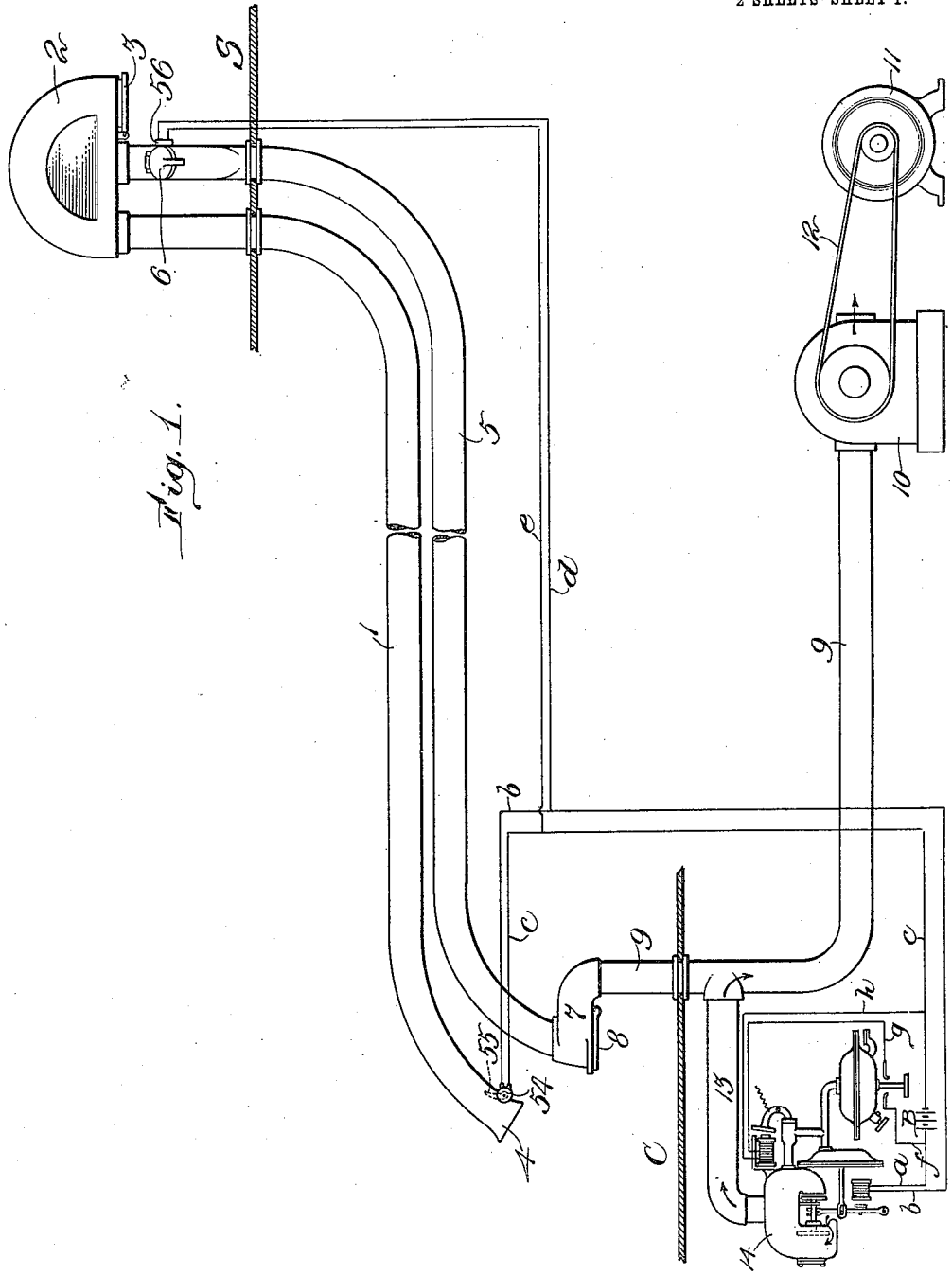

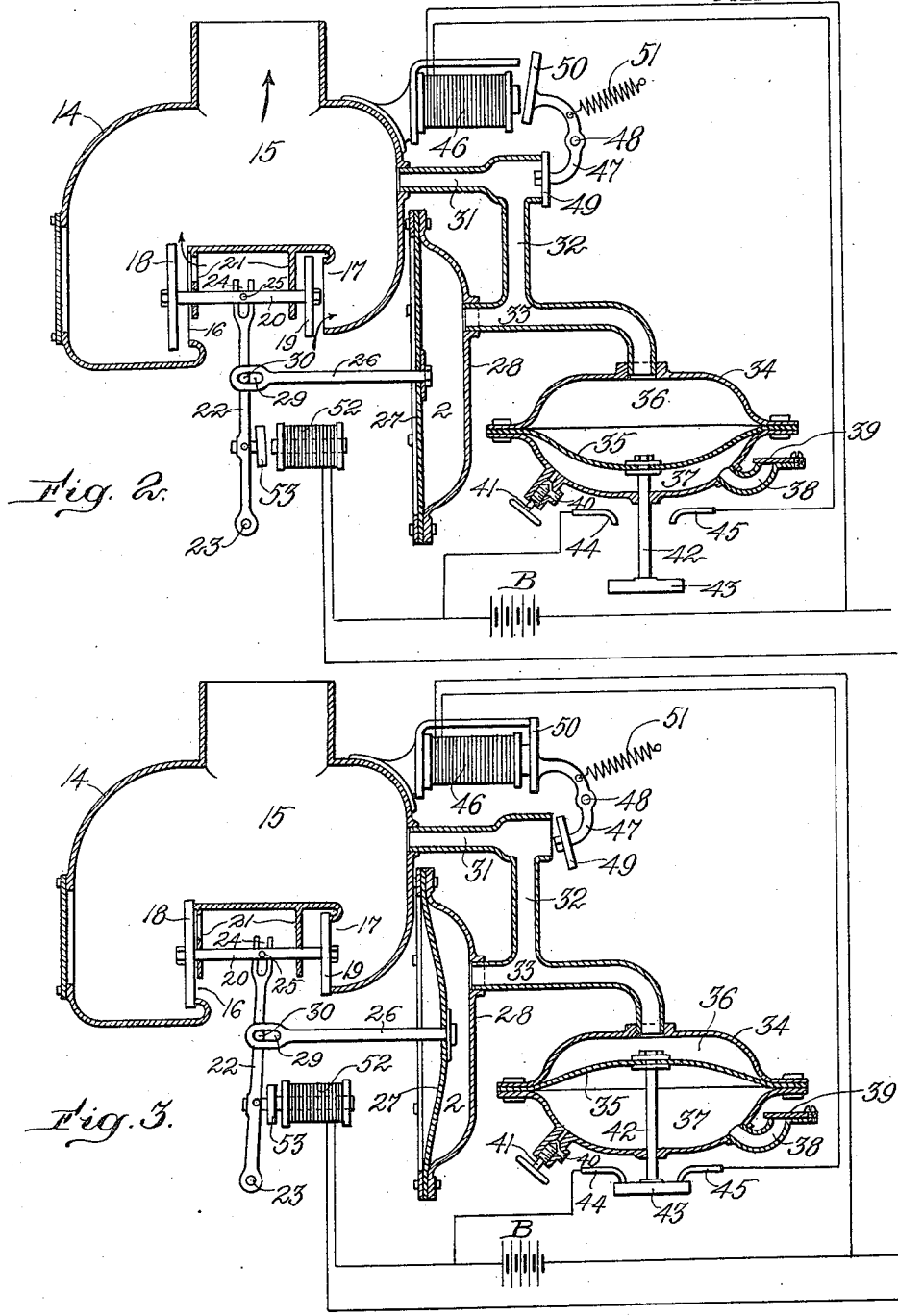

UNITED STATES PATENT OFFICE.

JAMES G. MACLAREN, OF WEEHAWKEN, NEW JERSEY, ASSIGNOR TO LAMSON CONSOLIDATED STORE SERVICE COMPANY, OF NEWARK, NEW JERSEY, A CORPORATION OF NEW JERSEY.

PNEUMATIC-DESPATCH-TUBE APPARATUS.

1,032,150. Specification of Letters Patent. Patented July 9, 1912.

Application filed May 14, 1908, Serial No. 432,800. Renewed May 17, 1912. Serial No. 698,075.

*To all whom it may concern:*

Be it known that I, JAMES G. MACLAREN, of Weehawken, in the county of Hudson and State of New Jersey, have invented certain new and useful Improvements in Pneumatic-Despatch-Tube Apparatus, of which the following is a specification.

My invention relates to improvements in pneumatic despatch tube apparatus and its object is to provide means for controlling the blower or pump connected with the transmission tube to permit the same to operate unloaded when there are no carriers in transit and to load the same by switching the current of air through the transmission tubes when carriers are despatched for the purpose of transmitting the carriers to their destination. Means are also provided for timing the communication of the blower or pump with the transmission tube to the interval necessary for the proper transmission and delivery of the carriers.

In the accompanying drawings which illustrate a construction embodying my invention, Figure 1 is a diagrammatic view showing a circuit of pneumatic transmission tubes connected with a constantly operating blower or pump and showing the controlling mechanism in connection therewith and electric circuits for operating said controlling mechanism from the despatching stations; Fig. 2 is an enlarged sectional view showing the controlling mechanism in normal position with the current of air short circuited permitting the blower to operate unloaded; Fig. 3 is a similar view to Fig. 2 showing the position of the controlling mechanism when a carrier is in transit and about to deliver.

Like letters of reference refer to like parts throughout the several views.

1 is a tube for the transmission of carriers connecting the central or cashier's station C with the terminal 2 controlled by the delivery valve 3 at the sub or sales-station S.

5 is a tube for the transmission of carriers from the sub-station S to the central station C and connects the terminal 2 with the terminal 7 controlled by the ordinary delivery valve 8 at the central station C.

9 is a conduit or air tube connecting the terminal 7 with the blower 10 driven at a constant speed by the electric motor 11 through a belt 12.

4 is the bell mouth or despatching inlet for inserting carriers into the transmission tube 1 and 6 is the usual despatching inlet for inserting carriers into the transmission tube 5.

13 is an air-inlet tube connecting the conduit 9 with the chamber 15 in a casing 14; 16 and 17 are ports for the admission of air to the chamber 15, and 18 and 19 are valves normally open and adapted to control the admission of air through the said ports 16 and 17 respectively; these valves 18 and 19 are mounted on the stem 20 which is reciprocally mounted on the hangers 21; 22 is a lever pivoted at its lower end at 23, its upper end being bifurcated at 24 and adapted to straddle the pin 25 on stem 20 to operate valves 18 and 19.

53 is an armature secured to the lever 22 and adapted to be operated by the magnet 52 which is in circuit with the battery B and a switch 54 adapted to be operated by trip 55 when a carrier is inserted into the bell mouth 4.

The circuit is as follows: from battery B through the wire *a*, magnet 52, wire *b*, switch 54 and wire *c* back to the battery B. A normally open switch 56 is adapted to be operated by the despatching inlet 6 at the sub-station S and is in multiple circuit with said magnet 52 through wires *e* and *d*.

34 is a diaphragm casing carrying mounted therein the diaphragm 35, the stem 42 connected with said diaphragm at its upper end and at its lower end carrying the bridge-piece 43; the chamber 37 beneath said diaphragm 35 is connected with the atmosphere through a passage 40 controlled by the timing valve 41; 38 is a passage connecting said chamber 37 with the atmosphere and controlled by the flap valve 39 to permit the quick exhaust of the air from said chamber 37 when the diaphragm 35 drops. The chamber 36 above the diaphragm 35 is connected with chamber 15 through passages 31, 32 and 33.

49 is a valve mounted on the lever 47 pivoted at 48 and held normally closed by a spring 51; this valve 49 is adapted when opened to admit air to the passages 32 and 33; on the opposite of the lever 47 is an armature 50 which is operated by magnet 46 to open said valve 49. The magnet 46 is in circuit with battery B through wires *h* and *c* and through wire *g*, contacts 45 and 44 and wires *f* and *a*.

27 is a diaphragm mounted in the casing 28 which diaphragm is open to the atmosphere on one side and on the other side communicates with chamber 2 which is connected with the passage 33; 26 is a stem secured at one end of said diaphragm 27, the opposite end of said stem having a slot 29 in which the pin 30 secured to the lever 22 is mounted.

In the normal position of the apparatus, see Figs. 1 and 2, the blower 10 is driven at a constant speed by the motor 11, and the air is admitted to the blower through openings 16 and 17, chamber 14, tube 13 and conduit 9, thereby permitting the blower to operate with practically no load. If a carrier is to be despatched from central station C to the sub-station S, the operator inserts the carrier into the bell mouth 4 where it engages the trip 55 closing the switch 54 and energizing the magnet 52 through the circuits hereinbefore described. The armature 53 is attracted by magnet 52 and acting through lever 22 and pin 25 moves valves 18 and 19 to their seats closing the ports 16 and 17 and cutting off the admission of air through said ports; the flow of air is now switched through the bell mouth 4 and transmission tubes 1 and 5 to the conduit 9 and blower 10, the carrier being driven through tube 1 toward the sub-station S. In the meantime, the carrier has passed the trip 55 opening the switch 54 and deënergizing the magnet 52. The increased vacuum in chamber 15 acts through passages 31, 32 and 33 and chamber 2 to hold the diaphragm 27 in the position shown in Fig. 3 holding the valves 18 and 19 closed against the atmospheric pressure. The vacuum also acting through passages 31, 32 and 33, and chamber 36 drawing the diaphragm 35 gradually upward due to the passage of air through the restricted opening 40 to chamber 37 beneath said diaphragm 35, causes the bridge piece 43 when said diaphragm 35 has reached the position shown in Fig. 3, to engage the contacts 44 and 45 completing the circuit through and energizing the magnet 46. The armature 50 is now attracted by said magnet and through lever 47 opens the valve 49 against the tension of spring 51 admitting air to the passages 32 33 and chambers 2 and 36. The diaphragm 27 is restored to normal position by means of the atmospheric pressure acting upon the valve 18 which is of greater area than valve 19 causing said valves to open to the position shown in Fig. 2 short-circuiting the flow of air through chamber 15, tube 13 and conduit 9 to the blower 10 and relieving the load upon said blower. In the meantime, the air entering through open valve 49 and passages 32 and 33 to chamber 36, allows the diaphragm 35 and bridge piece 43 to drop by gravity breaking the circuit through the magnet 46 thereby releasing the armature 50 and permitting the spring 51 to close the valve 49; by the time the valves 18 and 19 have been opened in the manner described, the carrier has delivered through valve 3 at the sub-station S. The adjustable timing screw 41 is adapted to be regulated to time the interval during which the valves 18 and 19 are closed to the interval necessary for the proper transmission and delivery of the carrier.

In despatching a carrier from the sub-station S to central station C, the operator opens the inlet 6 and inserts the carrier into tube 5; the opening of said inlet 6 closes the switch 56 energizing the magnet 52 and through armature 53 and lever 22 closes the valves 18 and 19 as heretofore described. The inlet 6 is now closed and the current of air entering through bell mouth 4 and tube 1, drives the carrier through tube 5 to the central station C. The closing of the inlet 6 opens the switch 56 deënergizing the magnet 52, the valves 18 and 19 being held closed by the diaphragm 27 until, by the time the vacuum in chamber 36 has lifted, the diaphragm 35 and bridge piece 43 closing the circuit through magnet 46, the valve 49 is opened releasing the diaphragm 37 and permitting the atmospheric pressure on valve 18 to open the valves 18 and 19, short-circuiting the flow of air through the blower by the time the carrier has arrived at the central station C.

Having thus described my invention and set forth a construction embodying the same, what I claim as new and desire to secure by Letters Patent of the United States is,—

1. In pneumatic despatch tube apparatus, a tube for the transmission of carriers, a pump connected with said tube to exhaust the air from the same, a casing provided with a chamber having an inlet for outside air, an air-conduit forming a communication between said chamber and the connection of the pump with the transmission tube, a valve controlling the inlet of said chamber, electric means energized by the insertion of a carrier in the transmission tube for moving said valve to close said inlet, pneumatic mechanism having an opening to the outside air communicating with said chamber and actuated by a decrease of pressure therein to close the circuit of the electric means, a valve normally closing the opening to the outside air of the pneumatic mechanism, and electric means energized by the closing of the circuit through the first electric means to actuate the last mentioned valve to open the pneumatic mechanism to the outside air.

2. In pneumatic despatch tube apparatus, a tube for the transmission of carriers, a pump connected with said tube to exhaust air from the same, a casing provided with a chamber having an inlet for outside air, an air-conduit forming a communication between said chamber and the connection of the pump with the transmission tube, a valve controlling the inlet of said chamber, electric means energized by the insertion of a carrier in the transmission tube for moving said valve to close said inlet, pneumatic mechanism having an opening to the outside air communicating with said chamber and actuated by a decrease of pressure therein to close the circuit of the electric means, a valve normally closing the opening to the outside air of the pneumatic mechanism, electric means energized by the closing of the circuit through the first electric means to actuate the last mentioned valve to open the pneumatic mechanism to the outside air, and means for timing the operation of the pneumatic mechanism.

In testimony whereof, I have signed my name to this specification in the presence of two subscribing witnesses, this fifth day of May A. D. 1908.

JAMES G. MACLAREN.

Witnesses:
ELSIE MACLAREN,
LOUIS M. LANMAN.

Copies of this patent may be obtained for five cents each, by addressing the "Commissioner of Patents, Washington, D. C."